Feb. 1, 1966 M. CHODOROW 3,233,139
SLOW WAVE CIRCUIT HAVING NEGATIVE MUTUAL INDUCTIVE COUPLING BETWEEN ADJACENT SECTIONS
Original Filed Sept. 26, 1955 5 Sheets-Sheet 1
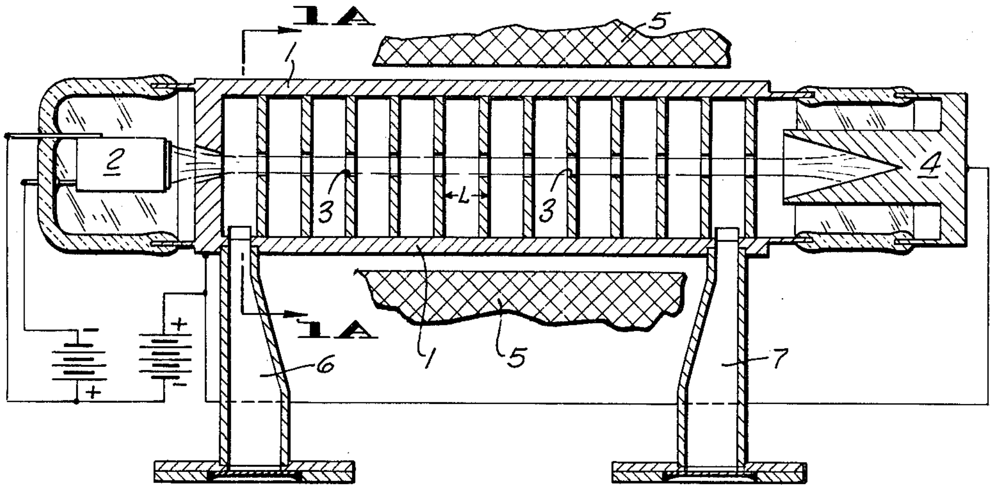
FIG. 1
PRIOR ART
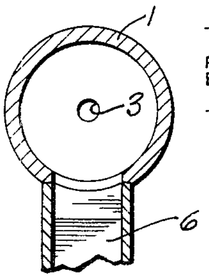
FIG. 1A
PRIOR ART
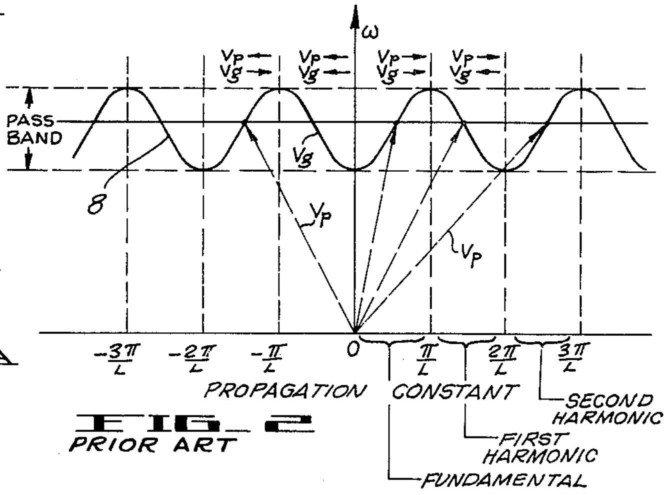
FIG. 2
PRIOR ART
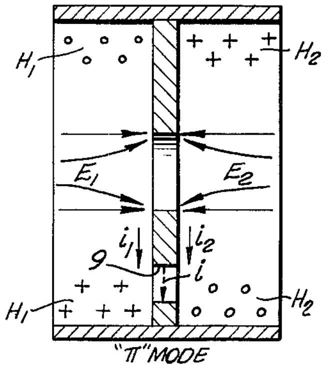
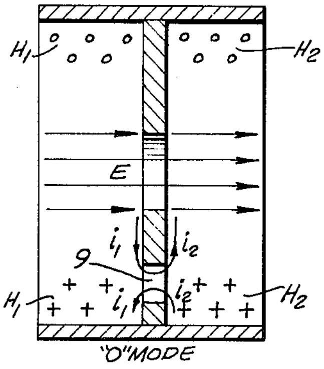
FIG. 3 FIG. 4
PRIOR ART PRIOR ART
MARVIN CHODOROW
INVENTOR.
BY Paul B. Hunter
ATTORNEY INVENTOR.
MARVIN CHODOROW
BY
[signature]
ATTORNEY

MARVIN CHODOROW
INVENTOR.

BY Paul S. Hunter
ATTORNEY

MARVIN CHODOROW
INVENTOR.

BY Paul B. Hunter
ATTORNEY

Feb. 1, 1966 M. CHODOROW 3,233,139
SLOW WAVE CIRCUIT HAVING NEGATIVE MUTUAL INDUCTIVE
COUPLING BETWEEN ADJACENT SECTIONS
Original Filed Sept. 26, 1955 5 Sheets-Sheet 5

INVENTOR.
MARVIN CHODOROW
BY Harry E. Aine
ATTORNEY

United States Patent Office 3,233,139

Patented Feb. 1, 1966

3,233,139

SLOW WAVE CIRCUIT HAVING NEGATIVE MUTUAL INDUCTIVE COUPLING BETWEEN ADJACENT SECTIONS

Marvin Chodorow, Menlo Park, Calif., assignor to Varian Associates, San Carlos, Calif., a corporation of California Continuation of abandoned application Ser. No. 536,597, Sept. 26, 1955. This application Feb. 8, 1960, Ser. No. 7,481

38 Claims. (Cl. 315—3.5)

Figures 5, 6:
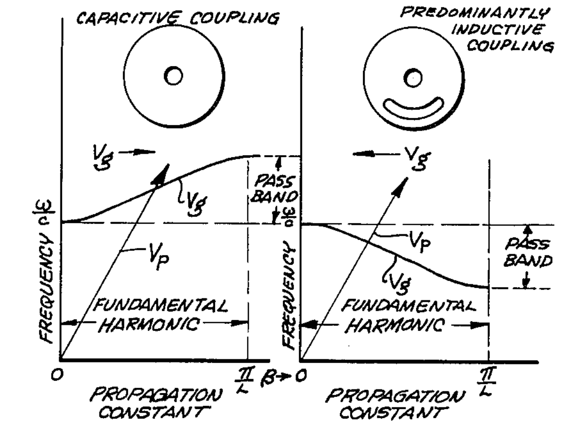
FIG. 5 PRIOR ART FIG. 6 PRIOR ART

This invention relates in general to high frequency apparatus and more specifically to novel inductive coupling means and methods for producing such coupling means as are particularly useful in propagation circuits utilized in traveling wave tubes, backward wave oscillators, linear accelerators, microwave filters and the like.

This application is a continuation of my copending application, Serial No. 536,597, filed September 26, 1955, for improvements in Inductive Coupling Means and Methods for High Frequency Apparatus, which is now abandoned.

Loaded waveguides or transmission lines have been often used as the wave propagating circuits for traveling wave tubes. These devices are filter type circuits consisting of waveguides with some sort of periodic loading to slow the wave velocity down to that of the electron in the beam. They have the advantage over the helix type structure of being much more rugged, being capable of dissipating much larger amounts of heat, and of having a greater degree of uniformity form section to section while using ordinary machining practices, thus permitting reproduction with comparative ease.

Heretofore, the inductive coupling between sections has posed a problem; for example, in designing an efficient high-power traveling wave tube using a periodically loaded waveguide with predominately inductive coupling it was necessary to design for operation on the first space harmonic because of the negative group velocity of the fundamental harmonic. Such operation is not as desirable as operation on the fundamental because of the low amplitude of the higher harmonics and therefore less interaction between the electron beam and the traveling wave. The present invention provides a novel means for inductively coupling between periodic sections of a slow wave structure such that the fundamental space harmonic will have a positive group velocity and thus provide a greatly enhanced structure for traveling wave tube amplifiers.

The principal object of the present invention is to provide in high frequency apparatus a novel improved inductive coupling means and method for making such means which may be utilized between sections of a periodic wave-propagating structure to achieve certain desirable propagation characteristics.

One feature of the present invention is the provision of a novel periodic wave-propagating structure having a combination of inductive coupling slots in cooperation with periodic section deformities whereby negative mutual inductive coupling is provided between coupled sections.

Another feature of the present invention is the provision of a novel wave-propagating periodic structure as described in the above feature in which the coupled sections may comprise a plurality of successive rectangular periodic sections, such sections being rotationally displaced with respect to each other, or may comprise a plurality of successive parallelogram periodic sections rotationally displaced with respect to each other, or may comprise a plurality of successive circular waveguide sections having diametrically opposed indentations, the sections being rotationally displaced with respect to each other, or, in another embodiment, may comprise a plurality of triangular shaped successive periodic sections rotationally displaced with respect to each other, or may comprise a plurality of successive circular periodic sections having fingers protruding inwardly at substantially 90° intervals, successive sections being rotationally displaced with respect to each other at substantially an angle of 45°, or, in still another embodiment, may comprise offset rectangular periodic sections.

Another feature of the present invention is a novel coupling loop means whereby negative mutual inductive coupling between sections of a periodic wave-propagating structure may be achieved.

Figure 7:
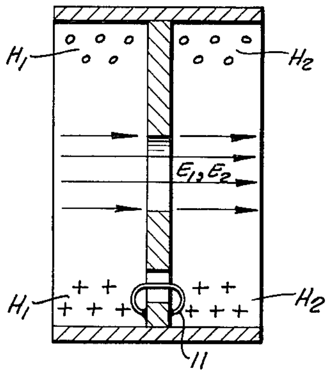
FIG. 7 PRIOR ART
Figure 8:
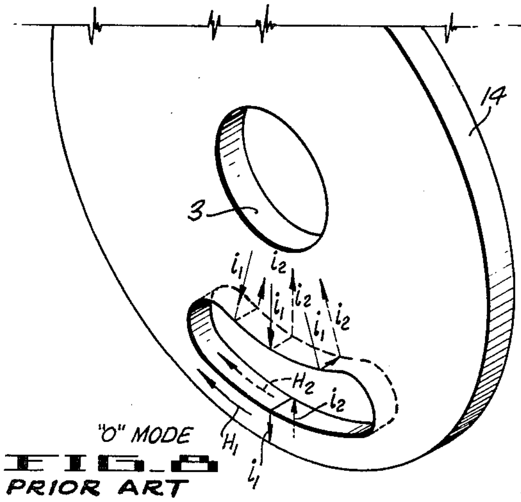
FIG. 8 PRIOR ART
Figure 9:
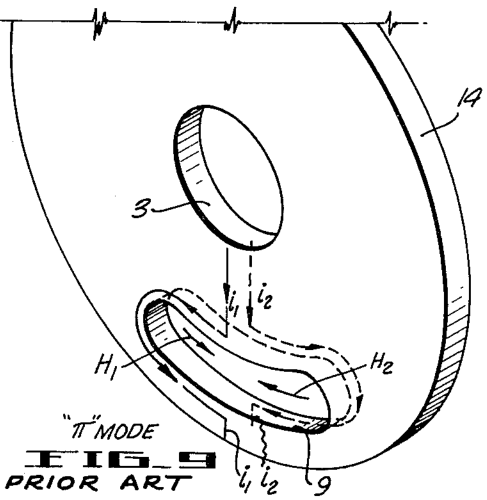
FIG. 9 PRIOR ART
Figures 10, 10A:
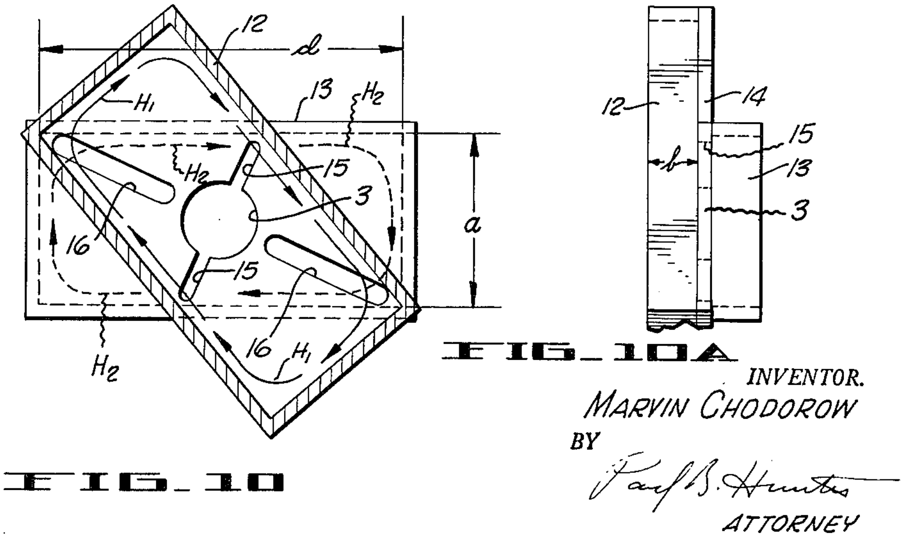
Figure 11:
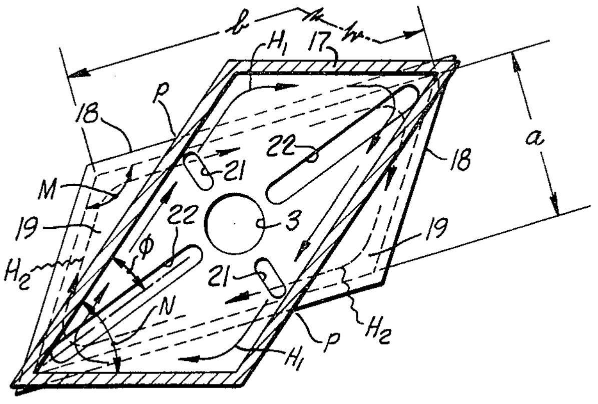
Figure 11A:
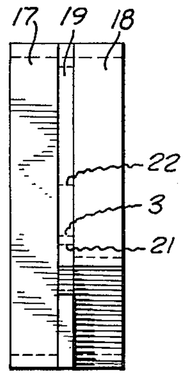
Figure 12:
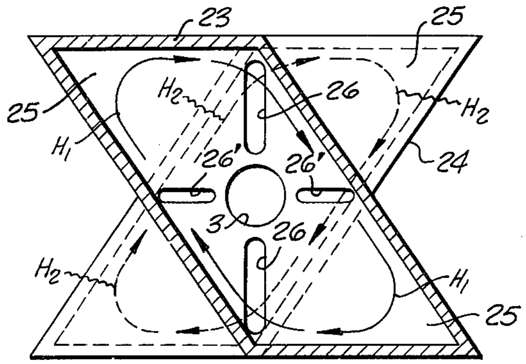
Figure 12A:
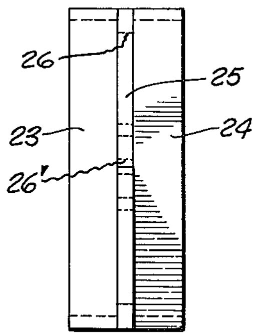
Figures 13, 13A, 14, 14A:
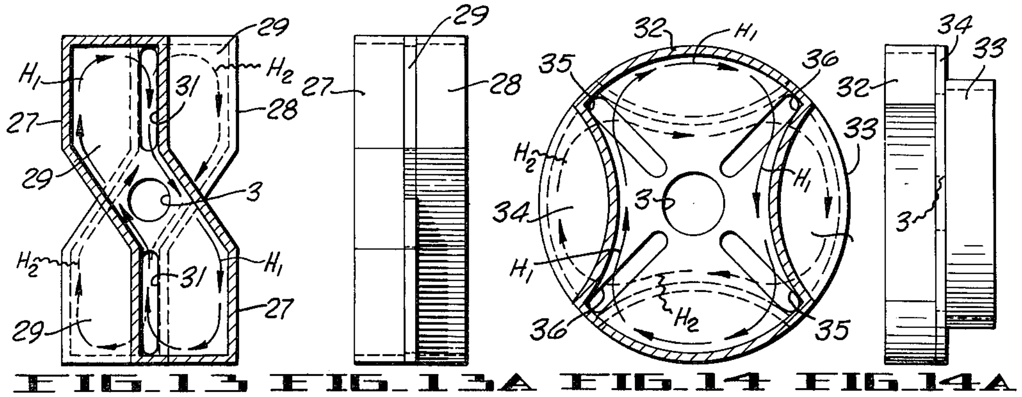
Figures 15, 15A:
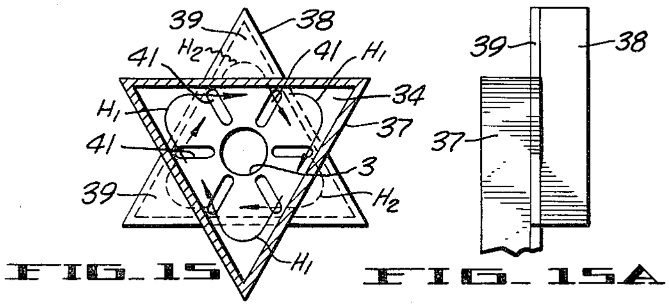
Figure 16:
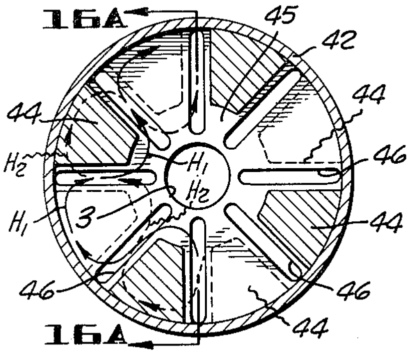
Figure 16A:
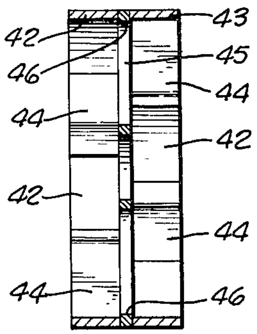
Figure 17:
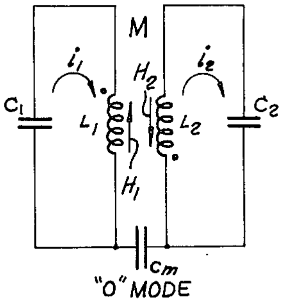
Figure 18:
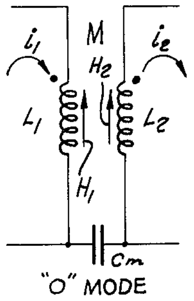
Figure 19:
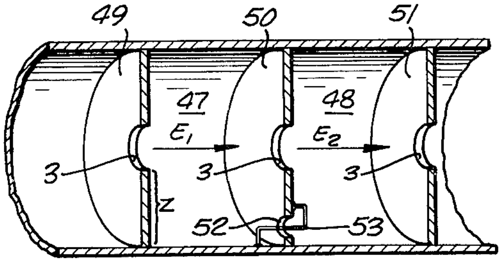
Figure 20:
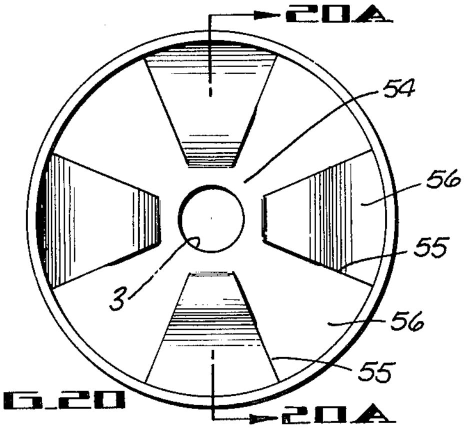
Figures 20A, 20B:
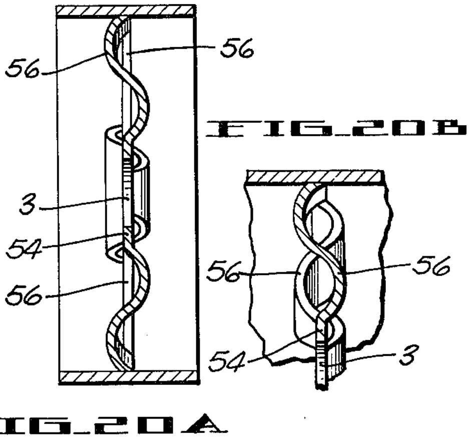
Figure 21:
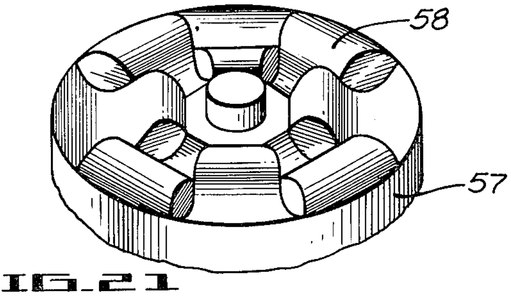
Figure 22:
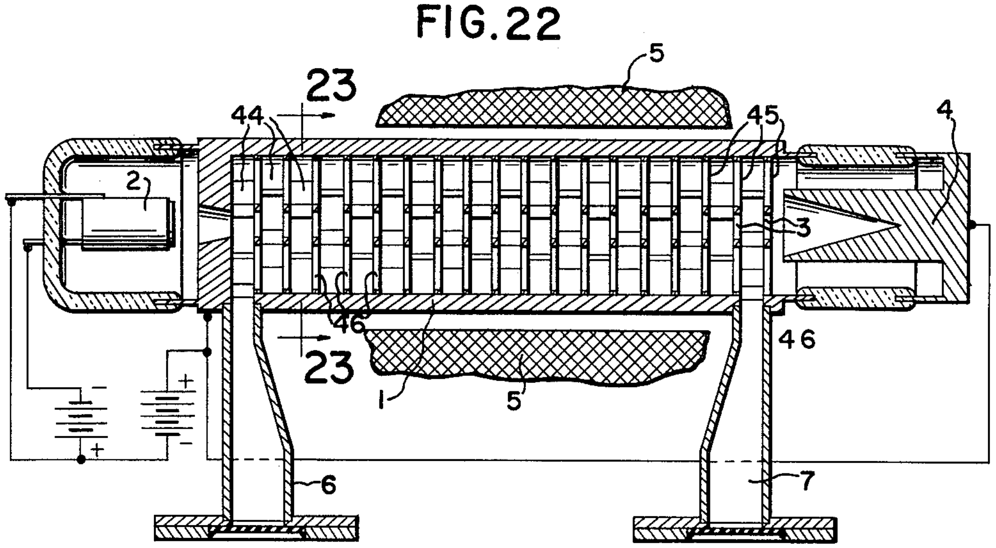
Figure 23:
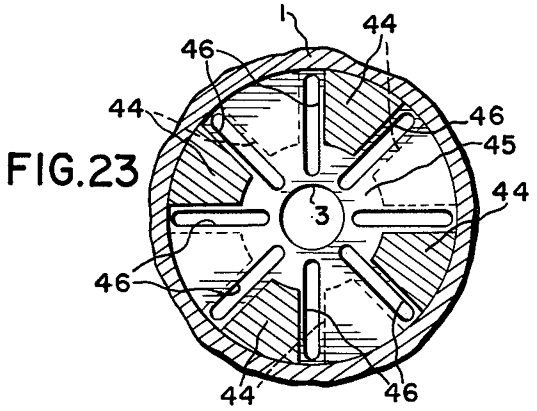

Other features and advantages of this invention will become apparent from a perusal of the specifications taken in connection with the accompanying drawings wherein, FIG. 1 is a longitudinal section view of a prior art traveling wave tube having a disk loaded periodic slow wave structure, FIG. 1A is a fragmentary cross sectional view of the prior art structure of FIG. 1 taken along line 1A—1A in the direction of the arrows, FIG. 2 is a Brillouin diagram for a prior art periodic structure as shown in FIG. 1, FIG. 3 is a diagrammatic sketch of the electromagnetic field configurations of two successive periodic sections of a prior art loaded waveguide slow wave structure operating on the pi mode, FIG. 4 is a diagrammatic sketch of the electromagnetic field configurations of two successive prior art periodic sections of a loaded waveguide slow wave structure operating on the "0" mode, FIG. 5 is a partial Brillouin diagram showing the fundamental harmonic operation of a capacitive coupled prior art periodically loaded waveguide slow wave structure, FIG. 6 is a partial Brillouin diagram showing fundamental harmonic operation of a prior art periodically loaded waveguide slow wave structure which is predominantly inductive coupled, FIG. 7 is a diagrammatic sketch of two adjacent periodic waveguide sections of a prior art slow wave structure, showing the electromagnetic field configurations and a conventional inductive coupling loop, FIG. 8 is an enlarged fragmentary perspective view of the common wall between adjacent sections of the prior art periodically loaded waveguide structure of FIG. 4, FIG. 9 is an enlarged fragmentary perspective view of the common wala between adjacent sections of the prior art periodically loaded waveguide structure of FIG. 3, FIG. 10 is an end view of a novel rectangular wave-propagating structure, FIG. 10A is a fragmentary side view of the structure of FIG. 10, FIG. 11 is an end view of a novel parallelogram wave-propagating structure comprising successive parallelogram sections having their long diagonals coinciding, FIG. 11A is a fragmentary side view of the structure of FIG. 11, FIG. 12 is an end view of a novel parallelogram wave-propagating structure comprising successive parallelogram sections having their short diagonals coinciding, FIG. 12A is a side view of the structure shown in FIG. 12, FIG. 13 is an end view of a novel wave-propagating structure comprising offset rectangular sections, FIG. 13A is a side view of the structure shown in FIG. 13, FIG. 14 is an end view of a novel wave-propagating structure comprising successive cylindrical sections having diametrically opposed indentated side walls, FIG. 14A is a side view of the structure of FIG. 13, FIG. 15 is an end view of a novel wave-propagating structure comprising successive triangular shaped sections, FIG. 15A is a side view of the structure shown in FIG. 13, FIG. 16 is an end view of a novel wave-propagating structure comprising cylindrical sections having inwardly protruding fingers in quadrature, FIG. 16A is a cross sectional side view of the structure shown in FIG. 16 taken along line 16A in the direction of the arrows, FIG. 17 is an equivalent circuit diagram of two conventional inductively coupled periodic waveguide sections operating in the "0" mode, FIG. 18 is a partial equivalent circuit of the circuit of FIG. 17 showing the coupling elements operating in the "0" mode, the second section coil winding having been reversed, FIG. 19 is a cutaway perspective view of two successive periodic sections of a wave-propagating structure showing a novel inductive coupling loop, FIG. 20 is an end view of a novel common wall between successive sections of a periodically loaded wave-propagating structure, FIG. 20A is a cross-section view of the structure shown in FIG. 20 taken along section line 20A—20A, FIG. 20B is a fragmentary cross-sectional view of a novel double coupling loop variation of the structure shown in FIG. 20, and FIG. 21 is a perspective view of a novel male die for making common wall members as shown in FIG. 20B, FIG. 22 is a longitudinal sectional view of a traveling wave tube utilizing features of the present invention, and FIG. 23 is a transverse sectional view of the structure of FIG. 22 taken along line 23—23 in the direction of the arrows.

A brief theory of periodically loaded slow wave structures will first be presented followed by the theory and description of several embodiments of the present invention, all as applied to traveling wave tube design. In conclusion will be found a description of a novel method for making the coupling loop embodiment of the present invention.

Although the present invention will be explained as it is applied to a traveling wave tube amplifier, it will be readily apparent to those skilled in the art that the present invention has application to many different devices including backward wave oscillators, linear accelerators, microwave filters, and velocity modulating devices.

Referring now to FIGS. 1 and 1A there is shown a prior art traveling wave tube amplifier utilizing a periodically disk-loaded waveguide slow wave structure 1. A cathode assembly 2 provides a beam of electrons which is passed axially through a series of central capacitive coupling apertures 3 in the slow wave structure 1. A collector assembly 4 is provided at the terminating end of the slow wave structure and serves to collect the electrons of the beam and dissipate the power therein. A focusing electrical coil 5 surrounds the slow wave structure 1 providing a magnetic field to focus and confine the electron beam thereby minimizing beam interception within the slow wave structure. An input waveguide section 6 transmits an electromagnetic wave signal to the slow wave structure 1. The signal wave is propagated along the slow wave structure 1 wherein energy is delivered to the signal wave from the electron beam thereby increasing the amplitude of the signal wave. An output waveguide section 7 receives the amplified signal and propagates it to the load. The mean direction of R.F. power flow on the slow wave circuit defines the direction of circuit development. In the case of a linear tube as shown in FIG. 1 the power flow on the slow wave circuit is coincident with the longitudinal axis of the tube.

The R.F. electrical properties of this slow wave structure 1 can conveniently be described by a Brillouin diagram (FIG. 2). The sinusoidal curve 8 shown in the Brillouin diagram has maximum and minimum peaks representing the cutoff frequencies of the structure. The instantaneous slope of the sinusoidal curve 8 represents the group velocity $V_g$ of the traveling wave on the structure. The slope of the straight line emenating from the origin O and intersecting the sinusoidal curve 8 represents the phase velocity $V_p$ of the traveling wave. The closer the electron velocity of the beam approaches the phase velocity of the traveling wave the more interaction that takes place between the wave and the beam. The nearer the phase velocity $V_p$ approaches the group velocity $V_g$ of the traveling wave over the pass band the larger will be the band width of the traveling wave tube amplifier.

It should be noted that for the particular capacitively coupled slow wave structure of FIG. 1, high frequency cutoff for fundamental harmonic operation occurs at a point corresponding to a propagation constant of $\pi/L$ where L is the distance between loading members. This point is known as the pi mode of operation and defines a condition in which the electromagnetic fields in adjacent periodic sections are 180 electrical degrees out of phase with respect to each other (FIG. 3) resulting in no forward wave propagation. On the other hand, the lower cutoff frequency for this capacitively coupled structure occurs at a propagation constant of 0, the electromagnetic fields in adjacent periodic sections being in phase (FIG. 4), and this condition is known as the "0" mode. Again, as in the pi mode, the "0" mode represents a traveling wave having zero group velocity.

The periodic structure shown in FIG. 1 is designed primarily for operation on the T.M. mode which corresponds to a field configuration within the periodic section as shown in FIGS. 3 and 4, that is a configuration wherein there are present strong axial electric fields in the center of the periodic section and strong magnetic fields disposed near the outer periphery of the section. A prior art structure as shown in FIG. 1 having a coupling hole 3 disposed in the vicinity of the strong electrical field corresponds to a structure which is capacitively coupled and the electrical properties of such a structure for fundamental operation can be described by the Brillouin diagram shown in FIG. 5.

Referring now to FIG. 5 it can be seen that for the prior art capacitively coupled structure the traveling wave has a forward group velocity $V_g$ and a forward phase velocity $V_p$ and provides fairly good band width for fundamental operation. However, to increase the capacitive coupling between periodic sections of the slow wave structure the coupling center hole 3 must be increased in diameter. Increasing the center hole diameter has the deleterious effect of reducing interaction between the electron beam and the traveling wave. Thus it would appear that if additional coupling is desired it must be inductive or magnetic coupling.

Inductive coupling for the periodically loaded waveguide structure is conventionally achieved by providing an opening or slot 9 (FIGS. 3 and 4) in the common wall between successive periodic sections in a region of relatively strong magnetic fields. Another prior art method for achieving inductive coupling is to provide inductive coupling loops 11 in regions of strong magnetic fields as shown in FIG. 7. The frequency versus propagation constant characteristics (Brillouin diagram) for the prior art coupling which is predominantly inductive is shown in FIG. 6. Utilizing conventional predominantly inductive coupling the fundamental harmonic of the traveling wave has a negative velocity $V_g$ thus making fundamental operation as a traveling wave tube amplifier impossible.

An examination of the common wall between adjacent periodic sections will be helpful in giving some insight into the inductive coupling principles involved. FIG. 8 shows a partial section of a cutaway common wall for "0" mode operation and prior art conventional inductive coupling (FIGS. 3 and 4), that is, the coupling slot positioned in the vicinity of strong magnetic fields. From the previous discussion it is expected that the "0" mode frequency should be unaffected and it can be seen that the currents flowing in the common wall are relatively unaffected since currents on opposite sides of the wall are equal and oppositely directed. The interrupting coupling slot has little or no effect because a path is opened up for the current to flow across the thickness of the opened wall and the length of the current path is substantially the same as before the opening was made. However, for the pi modal operation of the prior art structure (FIG. 9) currents flow in the same direction on opposite sides of the wall. In such a case the currents must be diverted around the opening thereby increasing the length of the current path and thus the inductance of the sections. This increased inductance lowers the resonant frequency of the pi modal operation as was stated earlier in the description and shown in FIG. 6. Thus it may be summarized that coupling slots that increase the current path for a certain mode cause that particular mode of operation to be perturbed down in frequency and the mode 180 electrical degrees out of phase thereto remains substantially unaffected.

Applying the aforementioned perturbation principle to the fundamental harmonic operation containing some capacitive coupling, it would be most desirable to perturb the "0" mode down in frequency but leave unaffected the capacitive coupling which would tend to increase the frequency of the pi mode. This type of coupling would give a wide band width with accompanying positive group and phase velocities.

Accordingly, one embodiment of the present invention may be summarized in stating that two adjacent coupled periodic sections are so formed and arranged with respect to each other that for the overall electric and magnetic field configuration corresponding to "0" mode the inductive coupling slots are so placed that local currents on opposite sides of the coupling slot are diverted around the coupling slot, whereby the frequency of the "0" mode is lowered. This novel inductive coupling concept is referred to as negative mutual inductive coupling. The term negative mutual is descriptive of a mutual inductance of opposite sign than that of the conventional inductive couplings (FIGS. 3, 4 and 7). Several exemplary structures which have been formed and arranged to provide a lowered "0" mode of operation (negative mutual inductive coupling) and thus useful for traveling wave tube amplifiers are described below.

Referring now to FIG. 10 there is shown a very simple rectangular slow wave structure incorporating the present novel negative mutual inductive coupling slot means. Two short sections of rectangular waveguide 12 and 13 are rotated with respect to each other, such that their long diagonals coincide, and are joined at their ends to a separating, conducting, common wall 14 having a plurality of coupling openings therethrough. A circular coupling hole 3 is provided in the center of the common wall 14 whereby electrical coupling between sections is achieved, this hole serving to accommodate a beam of electrons. Two pairs of narrow inductive coupling slots 15 and 16 have been provided in the common wall 14, said pairs of slots being positioned at right angles to each other. For "0" mode operation there exists a substantial component of current directed perpendicular to the slot length and in the same direction on opposite sides of the common wall 14 in the vicinity of the coupling slots 15 and 16, thus providing the desired lowering of the "0" mode whereby broad band operation is achieved.

To simplify illustration, the magnetic field lines $H_1$ in section12 and $H_2$ in adjacent section 13 are shown for "0" mode operation and it is noted that the respective $H_1$ lines have large components parallel to the slot length running in opposite directions on opposite sides of the wall 14. Since the currents in the respective sections are perpendicular to the H lines, it is evident that, as stated above, substantial components of the currents are directed perpendicular to the slot length and run in the same direction on either side of the wall 14. In the subsequent embodiments of this invention, the field lines $H_1$ and $H_2$ in adjacent sections in all cases have large components parallel to the coupling slot lengths, the components running in opposite directions on opposite sides of the common wall, thus producing the proper negative mutual inductive coupling effect.

A structure as shown in FIG. 10 comprising two such waveguide segments 12 and 13 having the following dimensions: $a$ (height)=2", $d$ (width)=4", $$b \text{ (depth)}=\tfrac{3}{8}''$$

longer coupling slot 16 length=1.25 " and width=0.25", common wall thickness 0.010" and a center coupling hole 0.75" in diameter, has a pass band extending from 3.065 kilo-megacycles to 3.395 kilo-megacycles thus giving a band width of the order of 10%.

Another embodiment of the present invention is shown in FIGS. 11 and 11A wherein two parallelogram periodic waveguide sections 17 and 18 are joined at their ends to a common end wall 19. Sections 17 and 18 are supplementary parallelograms in that corresponding angles, for example, M and N of the respective parallelograms are supplementary angles (sum of angles $M$ and $N=180°$). The parallelogram periodic sections 17 and 18 have been rotationally displaced with respect to each other about the longitudinal axis of the structure such that their long diagonals are made to coincide. A center hole 3 is provided in the common wall 19 to give capacitive coupling and to accommodate an electron beam. Two pairs of inductive coupling slots 21 and 22 are cut through the common wall 19, one pair 22 being longer than the other and cut through along the coinciding long diagonals of the parallelogram structure. The other or short pair of inductive coupling slots 21 is cut radially outward from the center hole 3 toward the intersecting point P of the side walls of the two periodic sections 17 and 18.

The resonant frequency of one periodic section of the parallelogram slow wave structure operating in the $TM_{010}$ mode can be found approximately from the following expression $$\lambda 0=\frac{2ab}{\sqrt{a^2+b^2}}$$

where $a$ is the height of the parallelogram, $b$ is the length of the longest leg of the parallelogram and $\lambda 0$ is the wave length of the resonant frequency. For cavity dimensions substantially the same as the previously described rectangular structure, the center band width of the structure is 10% for values of $\phi$ ranging from 0° to 45°.

A further embodiment of the present invention is shown in FIGS. 12 and 12A wherein two parallelogram periodic waveguide sections 23 and 24 are joined at their ends to a common end wall 25 of a good conducting material as of copper having a center circular coupling hole 3. The sections 23 and 24 are rotated with respect to each other such that their short diagonals coincide. Two pairs of narrow inductive coupling slots 26 and 26' are provided between adjacent periodic sections, the longer slots 26 being located along the coinciding short diagonals of the joined sections 23 and 24. The shorter pair of inductive coupling slots 26' are disposed radially from the center hole 3 and at right angles to the long coupling slots 26. At a resonant frequency of 3.8 kilo-megacycles with dimensions comparable with the rectangular structure described above a filter band width of 8% is obtainable.

A further embodiment of the present invention is shown in FIGS. 13 and 13A wherein two offset rectangular waveguide sections 27 and 28 are joined at their ends to a common end wall 29 of a good conducting material as of copper. The offset rectangular periodic sections 27 and 28 are oppositely offset with respect to each other and are joined together at their ends such that the short sides (height) of the rectangular waveguide are parallel and their geometric centers are coinciding in axial alignment. One pair of inductive coupling slots 31 is cut through the common wall member 29 at the overlapping portions of the adjacent waveguide sections, the slots extending in a radial manner from the center hole 3.

Another embodiment of the present invention is shown in FIGS. 14 and 14A wherein two short lengths of circular waveguide 32 and 33 each have their side walls pushed inwardly on diametrically opposite sides. These sections 32 and 33 are rotated about their longitudinal axis an angle of 90° with respect to each other and joined at their ends to a conducting common wall 34. A circular capacitive coupling hole 3 and two pairs of narrow inductive coupling slots 35 and 36 are provided in the common wall, said slots extending radially outward toward the corners of the periodic sections.

A two section structure as shown in FIGS. 14 and 14A having the following dimensions: diameter 4.5", narrow diameter of section 2.5", depth of section ⅜", exhibits a resonant frequency of 2.78 kilo-megacycles in the $TM_{010}$ mode of oscillation and has a band width of 14%.

A further embodiment of the present invention is shown in FIGS. 15 and 15A wherein two short sections 37 and 38 of equilateral triangular waveguide are rotated 60° with respect to each other and joined at their ends to a conducting common wall 39. A circular capacitive coupling hole 3 is provided and also a plurality of narrow inductive coupling slots 41 radially extending from the center hole are cut through the common wall 39 at 60° intervals.

A structure of FIG. 15 having the following dimensions: inductive slots 1" x ¼", diameter center hole=0.75", triangular section 4.5" on a side and ⅜" deep, has a resonant frequency of 3.0 kilo-megacycles and a band width of 5%.

A further embodiment of the present invention is shown in FIGS. 16 and 16A wherein two short sections 42 and 43 of circular waveguide have inwardly protruding side wall portions or fingers 44 at 90° intervals about their circumference. The waveguide sections 42 and 43 are rotated 45° with respect to each other and joined at their ends to a conducting common wall 45. A circular capacitive coupling hole 3 and a plurality of narrow inductive coupling slots 46 are made through the common wall 45, the slots 46 extending radially outward to the periphery of the common wall and being spaced apart every 45° around the center hole 3. The inwardly projecting fingers 44 perturb the magnetic fields of the cavity and thus alter the resonant frequency of the cavity. The length of the fingers have a first order effect on frequency whereas the width of the fingers is only a second order effect on frequency. However, the width of the fingers is quite important in determining band width since wide fingers will cause more current to be diverted around the coupling slots than will narrow fingers.

A structure constructed as shown in FIG. 16 having the following dimensions: section diameter 4.5", section depth ¾", capacitive coupling hole diameter 1", inductive coupling slot length 1⅝", finger length 1.13", finger arc 45°, finger width at the wide base 1.22", has a resonant frequency of 3.1 kilo-megacycles and a band width of 25%.

The foregoing dimensions given in regard to the various structures employing negative mutual inductive coupling should be construed only in a demonstrative sense and in no way in a limiting sense. The structural dimensions are determined by the application and frequency range of the particular apparatus. Moreover, many modifications could be made without departing from the scope of the present invention.

When one considers the equivalent circuit (FIG. 17) of conventional inductively coupled periodic sections (FIGS. 3, 4 and 7), a single inductive coupling slot may be considered as two inductive elements $L_1$ and $L_2$, one in the circuit of each section, having mutual inductive coupling M therebetween. For the "0" mode of operation the currents in each circuit pass through the individual inductive elements $L_1$ and $L_2$ in the opposite direction and the magnetic coupling fields of the two elements or coils are in opposition and therefore cancel or buck each other. This canceling of the coupling magnetic fields between the two circuits accounts for the unperturbed "0" mode in the prior art.

The present invention then, in terms of the equivalent circuit, amounts to reversing the sense of the winding of the coil in the second section as shown in FIG. 18. Reversing the sense of the second section coil winding accounts for the additive magnetic coupling fields and the increased inductance for "0" mode operation. This increased inductance results in lowering the frequency of the "0" mode and leaving substantially unaltered the pi mode frequency.

The foregoing equivalent circuit principles are then applied in a novel improved negative mutual inductive coupling means as shown in FIG. 19 wherein there is shown two successive periodic sections 47 and 48 of a disk loaded waveguide slow wave structure. A center hole 3 is cut through the common wall disk members 49–51 to provide capacitive coupling between the periodic sections. A small inductive coupling hole 52 is cut through the common wall 50 near its periphery. A novel improved conductive coupling loop 53 of reversed S shape is threaded through the inductive coupling hole 52 and second at its ends to the common wall 50 in the second section and to the side wall in the first section. The electrical effect of the novel coupling loop 53 is the same as reversing the sense of the winding on the second section coil when compared to the conventional inductive coupling as shown in FIG. 7. Although in FIG. 19 the coupling loop 53 in the first periodic section is secured to the side wall thereof, the first section coupling loop end may be secured to the far end wall 49 in portion Z below the center hole 3 or to the common wall 50 below the inductive coupling hole 52. The electrical effect remains the same in all of the above optional points of connecting the loop end. Moreover, the coupling loop 53 may be rotated 180° about its longitudinal axis and the same electrical effect will be found. In short, the novel coupling loop 53 may be entirely or partially disposed most anywhere in the magnetic fields of the coupled sections so long as the induced electromotive forces (E.M.F.'s) in the loop 53 in the respective sections are bucking each other for the "0" mode of operation.

Another embodiment of the present invention is shown in FIGS. 20 and 20A wherein there is depicted a common wall 54 such as may be disposed between coupled periodic sections. A center hole 3 is provided to accommodate a beam of electrons and to give capacitive coupling between sections. Radial cuts 55 have been made in the common wall 54 to provide a plurality of radially extending segments or fingers 56 therebetween. Alternate ones of the fingers have been formed to an S shape (FIG. 20A). The remaining alternate fingers may be formed in a reversely directed S form as shown in FIG. 20B. An S or reverse S-shaped finger serves as an inductive coupling loop the same as the coupling loop 53 shown in FIG. 19. A common wall configuration whereby every finger is formed either in the reverse S or S shape (FIG. 20B) gives twice the inductive coupling of the alternate S formed finger configuration (FIGS. 20 and 20A). Other configurations of S-shaped fingers are conceivable and the coupling achieved with any given configuration will be proportional to the number of coupling finers 56 or loops 53. After these common wall members 54 having the S-shaped fingers 56 have been formed, the common wall 54 may be quite easily soldered or brazed into a length of circular waveguide at proper distances apart to readily form a periodically loaded slow wave structure.

A further embodiment of the present invention is a novel method for making the common wall members 54 having the S-shaped coupling fingers 56 (FIG. 20B). This method comprises the steps of: cutting a capacitive coupling hole 3 in the center of a circular conducting disk 54, of radially slotting the disk at a plurality of points about the circumference of the disk thereby providing a plurality of fingers 56 between the aforementioned slots, of placing the disk member 54 over a female die member 57 (FIG. 21) having a plurality of corrugated pi-like sections 58 on the surface thereof, of placing over the disk a male die member having a plurality of similar corrugated p-like sections on the surface thereof matching the contour of the female die member, and of then forcing said male and female die members together thereby quickly and precisely providing the desired number of S-shaped coupling fingers 56 on the disk member 54.

Although to facilitate explanation of the novel slow wave structures supra the description has been limited generally to only two coupled sections, in practice a slow wave structure may have been successive sections the number required being a function of the amplification desired.

Since many modifications in and variations from the described apparatus may be made without departing from the spirit of the invention, the foregoing embodiment of the invention are to be considered as exemplary and not in a limiting sense.

What is claimed is:

1. A high frequency slow wave circuit including, means forming at least three electrical resonators successively arranged along a predetermined line of circuit development, said resonator means being physically oriented with respect to the predetermined line of development to substantially align the in-phase mode of operation electric field lines within said resonator means with the predetermined line of circuit development, and means for producing negative mutual inductive coupling communicating between said resonator means whereby the frequency is lowered at which the electromagnetic field configurations are in phase in coupled resonators.

2. The apparatus according to claim 1, wherein said electrical resonator means include resonant waveguide sections, a conducting wall member separating adjacent resonant waveguide sections, and wherein said negative mutual inductive coupling means communicates between adjacent resonant waveguide sections through an aperture provided in said conducting wall member which separates adjacent resonant sections.

3. The apparatus according to claim 2 wherein said resonant waveguide sections are cavity resonators, and wherein said predetermined line of circuit development is substantially a straight line forming the longitudinal axis of the slow wave circuit, and wherein a plurality of said conducting wall members each include at least one capacitive coupling hole, the capacitive coupling holes being in substantial alignment with the longitudinal line of circuit development.

4. The apparatus according to claim 3 wherein said successive cavity resonators have substantially equal dimensions.

5. The apparatus according to claim 2 wherein said negative mutual inductive coupling means communicating between adjacent resonant waveguide sections includes S-shaped coupling members.

6. The apparatus according to claim 2 wherein said negative mutual inductive coupling means communicating between said adjacent resonant waveguide sections includes inductive coupling slots.

7. The apparatus according to claim 6 wherein said electrical resonators comprise resonant waveguide sections, wherein said predetermined line of circuit development comprises a rectilinear line of development forming the longitudinal axis of the high frequency apparatus.

8. The apparatus according to claim 7 wherein said separating conducting wall member is common to adjacent resonators and the inductive coupling slot cut therethrough is elongated, and wherein said negative mutual inductive coupling means includes means for diverting the in-phase mode of operation electric currents flowing on opposite sides of said common wall around said inductive coupling slot and said diverting means including first and second electrically conducting members carried from said common wall member, said conducting members being disposed on opposite sides of said common wall member and extending outwardly therefrom, and said conducting members having side walls thereof disposed with a substantial component of their length directed longitudinally of said slot, and said first and second conducting members being closely physically spaced to and disposed on opposite sides of the longitudinal margins of said elongated coupling slot.

9. The apparatus according to claim 7 wherein said in-phase mode of operation is the "0" mode of operation, wherein said adjacent resonant waveguide sections are substantially equally dimensioned, and wherein said resonant waveguide sections are physically oriented with respect to the rectilinear line of circuit development to substantially align the "0" mode of operation electric field lines collinearly with the rectilinear line of circuit development within said adjacent resonant waveguide sections.

10. The apparatus according to claim 9 wherein said conducting wall member separating adjacent waveguide sections includes a capacitive coupling hole therethrough, the center of the coupling hole substantially registering with an imaginary line drawn between points of maximum electric field intensity for the "0" mode in adjacent resonators.

11. A high frequency apparatus including, means forming a plurality of electrical resonators successively arranged along a predetermined line of circuit development, a conducting wall member separating adjacent resonator means and having an inductive coupling slot cut therethrough for magnetically coupling together said adjacent resonator means, said resonator means being physically oriented with respect to the predetermined line of circuit development to substantially align the inphase mode of operation electric field lines within said adjacent resonator means with the predetermined line of circuit development, and means for diverting the inphase mode of operation electric currents flowing on opposite sides of said common wall around said inductive coupling slot to produce negative mutual inductive coupling between adjacent resonator means and to produce a relatively low resonant operating frequency of said apparatus for the in-phase mode of operation.

12. A high frequency apparatus including, a plurality of electrical resonators successively arranged along a predetermined line of circuit development, a conducting wall member separating adjacent resonators, said resonators being physically oriented with respect to the predetermined line of circuit development to substantially align the in-phase mode of operation electric field lines within said adjacent resonator means with the predetermined line of circuit development, means forming an inductive coupling loop communicating between two of said resonators for inducing E.M.F.'s within said coupling loop means, the E.M.F's induced within said coupling loop means within the respective coupled resonators being in-phase opposition for the in-phase electromagnetic configuration within said two coupled resonators whereby a minimum of current flows in said coupling loop means thereby effectively lowering the resonant frequency of said apparatus for in-phase field configuration.

13. The apparatus according to claim 12 wherein said electrical resonators comprise resonant waveguide sections, wherein said inductive coupling loop means provides negative mutual inductive coupling between adjacent resonators through an aperture in said separating conducting wall member, and wherein said coupling loop means includes an S-shaped corrugated portion of said separating wall member disposed between spaced apart slots through said wall member.

14. Electrical apparatus including, a plurality of adjacent electrical resonator means, a common conducting wall separating said adjacent resonator means, means forming a negative mutual inductive coupling loop in said common wall, said negative mutual inductive coupling loop means including a corrugated portion of said common wall member disposed between spaced apart slots through said common wall member.

15. The apparatus according to claim 14 wherein said negative mutual inductive coupling loop means includes a second corrugated wall portion formed between spaced apart slots therethrough, said second corrugated wall portion being reversely corrugated with respect to said first corrugated wall portion.

16. The apparatus according to claim 14 wherein said common wall has a plurality of radial slots cut therethrough to form a plurality of fingers between the slots, and said inductive coupling loop means including alternate ones of said fingers being corrugated.

17. A high frequency apparatus comprising a plurality of substantially rectangular waveguide sections arranged end to end, adjacent ones of said waveguide sections being rotationally displaced about their longitudinal axis with respect to each other, and a common conducting separating wall member disposed between said adjacent waveguide sections having a plurality of inductive coupling slots cut therethrough whereby for the "0" mode of operation currents on opposite sides of said common wall will be diverted around said coupling slots thereby lowering the frequency of the "0" mode.

18. A wave propagating structure comprising a plurality of substantially rectangular waveguide sections arranged end to end, adjacent waveguide sections being rotationally displaced with respect to each other such that their long diagonals substantially coincide, and a common conducting wall separating successive rectangular waveguide sections having a centrally positioned circular capacitive coupling hole and two pair of inductive coupling slots therethrough, said two pair of inductive coupling slots being substantially in quadrature and extending radially outward from the centrally located coupling hole, one pair of said inductive coupling slots being positioned substantially along the coinciding long diagonals of said successively coupled waveguide sections.

19. In high frequency apparatus, a plurality of substantially parallelogram waveguide sections arranged end to end, adjacent waveguide sections being rotationally displaced with respect to each other, and a separating conducting common wall member joining said adjacent waveguide sections at their ends, means forming a plurality of narrow inductive coupling slots cut through said common wall member for diverting the "0" mode currents on opposite sides of said common wall around said coupling slots thereby lowering the frequency of the "0" mode.

20. In a wave propagating structure, a plurality of supplementary parallelogram waveguide sections successively arranged end to end, adjacent parallelogram sections being supplementary and rotationally displaced with respect to each other such that their long diagonals substantially coincide, and a common separating conducting wall member having a plurality of inductive slots and a centrally disposed capacitive coupling hole therein joining said adjacent waveguide sections at their ends, one pair of said inductive coupling slots disposed substantially along the coinciding long diagonals of said adjacent waveguide sections.

21. In a high frequency apparatus, a plurality of substantially parallelogram waveguide sections successively arranged end to end, adjacent parallelogram sections rotationally displaced with respect to each other such that their short diagonals substantially coincide, and a common separating conducting wall member disposed between adjacent waveguide sections and having a plurality of inductive slots and a central capacitive coupling hole cut therethrough, one pair of said inductive coupling slots disposed substantially along the coinciding short diagonals of said waveguide sections.

22. In a high frequency apparatus, a plurality of offset substantially rectangular waveguide sections arranged end to end, adjacent waveguide sections being oppositely offset with respect to each other, and a separating conducting common wall member joining said adjacent waveguide sections at their ends, means forming a plurality of narrow inductive coupling slots cut through said common wall member for diverting "0" mode currents on opposite sides of said common wall around said coupling slot means thereby lowering the frequency of the "0" mode.

23. In a waveguide propagating structure, a plurality of offset substantially rectangular waveguide sections successively arranged end to end, adjacent waveguide sections being oppositely offset with respect to each other, and a common separating conducting wall member disposed between adjacent waveguide sections and having a pair of inductive slots and a central capacitive coupling hole cut therethrough, said adjacent waveguide sections having their axial geometric center lines substantially coinciding and their short sides substantially parallel to each other, said pair of inductive coupling slots radially disposed from said central coupling hole and the length thereof being substantially perpendicular to said parallel short sides.

24. In a high frequency apparatus, a plurality of substantially circular waveguide sections arranged end to end, each having their side walls pushed inwardly on diametrically opposite sides, adjacent waveguide sections being rotationally displaced with respect to each other by a certain angle, a separating conducting common wall member disposed between adjacent waveguide sections and having a plurality of narrow inductive coupling slots cut therethrough, and the certain angle of rotational displacement between adjacent waveguide sections being of sufficient magnitude to divert the "0" mode currents on opposite sides of said common wall around the coupling slots thereby lowering the frequency of the "0" mode.

25. In a wave propagating structure, a plurality of substantially circular waveguide sections, each having their side walls pushed inwardly on diametrically opposite sides, said sections successively arranged end to end, adjacent waveguide sections being rotationally displaced substantially an angle of 90° with respect to each other and a common separating conducting wall member disposed between adjacent waveguide sections and having a plurality of inductive slots and a centrally disposed capacitive coupling slot therein, certain of said inductive coupling slots extending radially outward of said capacitive coupling hole toward the corners of said waveguide sections formed where the indents in the side wall start.

26. In a high frequency apparatus, a plurality of triangular waveguide sections arranged end to end, adjacent waveguide sections being rotationally displaced with respect to each other, and a separating conducting common wall member disposed between adjacent waveguide sections, and means forming a plurality of narrow inductive coupling slots cut through said common wall member for diverting "0" mode currents on opposite sides of said common wall around said coupling slots thereby lowering the frequency of the "0" mode.

27. In a wave propagating structure, a plurality of substantially equilateral triangular waveguide sections successively arranged end to end, adjacent triangular sections being rotationally displaced with repsect to each other an angle of substantially 60°, and a common separating conducting wall member disposed between adjacent waveguide sections and having a plurality of inductive slots and a centrally disposed capacitive coupling hole cut therein, said inductive coupling slots extending radially outward from said centrally disposed capacitive coupling hole at substantially 60° intervals.

28. In a high frequency apparatus, a plurality of substantially circular waveguide sections having substantially circular side wall portions arranged end to end, said waveguide sections having a plurality of inwardly protruding fingers from the side walls, and a separating conducting common wall member disposed between adjacent waveguide sections, means forming a plurality of narrow inductive coupling slots cut through said common wall member for diverting currents associated with the in-phase electromagnetic configuration in adjacent waveguide sections on opposite sides of said common wall around said coupling slot means thereby lowering the frequency of the apparatus for the in-phase electromagnetic configuration.

29. In a wave propagating structure, a plurality of substantially circular waveguide sections having substantially circular side wall portions successively arranged end to end, said waveguide sections having conducting fingers inwardly protruding from the side walls at substantially 90° intervals about the periphery of said waveguide sections, adjacent sections being rotationally displaced with respect to each other an angle of substantially 45°, and a common separating conducting wall member disposed between adjacent waveguide sections and having a plurality of inductive slots and a centrally disposed capacitive coupling hole therein, said inductive coupling slots extending radially outward from the center hole.

30. A high frequency apparatus comprising, a plurality of cavity resonators, including a conducting common wall member separating adjacent cavities and having a hole cut therethrough in the region of magnetic field, and means forming an inductive coupling loop member threaded through the hole and having portions of its length disposed in the areas of strong magnetic fields of said adjacent cavities for inducing therein electromotive forces within the respective coupled cavities which are in opposition for the mode of operation wherein the electromagnetic field configurations are in phase in adjacent waveguide sections.

31. A wave propagating structure comprising a periodically loaded waveguide and a transverse loading wall member mounted within the waveguide, said loading wall member having a radially extending corrugated inductive coupling finger thereon, whereby the mode of operation wherein the electromagnetic field configurations are in phase on opposite sides of said wall member may be lowered in frequency.

32. In a periodically loaded waveguide wave propagating structure, a common wall loading member disposed therein, said loading member having a centrally disposed capacitive coupling hole therethrough and a plurality of radial slots cut through said loading member forming a plurality of inductive coupling fingers therebetween, said inductive coupling fingers being S-shaped.

33. A high frequency charged particle discharge apparatus including, means forming a source of charged particles, means forming a collector for the charge particles and serving to define a path of charged particle flow between said particle source means and said particle collector means, waveguide structure positioned along said path for electromagnetic interaction between the fields on said waveguide structure and the particles within the path of charged particle flow, means forming negative mutual inductive coupling communicating between spaced apart portions of said waveguide structure while operating in the in-phase mode of wave propagation for enhancing the interaction between the waves on said waveguide structure and the charged particles flowing along the path of charged particle flow, and means forming a high frequency wave energy terminal communicating with said waveguide structure for the passage of high frequency wave energy therethrough.

34. The apparatus according to claim 33, wherein said waveguide structure includes at least three adjacent waveguide sections successively arranged along the path of charged particle flow, conducting wall members separating adjacent waveguide sections, said negative mutual inductive coupling means communicating between adjacent waveguide sections through apertures provided in said conducting wall members, and said successive waveguide sections being physically oriented with respect to the path of charged particle flow to substantially align the in-phase mode of operation electric field lines within adjacent waveguide sections with the path of charged particle flow, whereby the frequency is lowered at which the electromagnetic field configurations are in phase in coupled waveguide sections.

35. The apparatus according to claim 34 wherein said negative mutual inductive coupling means includes means for diverting the in-phase mode of operation electric currents flowing on opposite sides of said separating conducting wall members around inductive coupling slots formed in and communicating through said wall members to produce the negative mutual inductive coupling between adjacent waveguide sections.

36. The apparatus according to claim 34 wherein said negative mutual inductive coupling means communicating between adjacent waveguide sections includes S-shaped coupling members.

37. A high frequency amplifier tube apparatus including, means forming a source of electrons, means forming a collector electrode for catching the electrons emitted from said electron source and serving to define a path of electron flow between said electron source means and said collector electrode means, waveguide structure including at least three resonant waveguide sections successively arranged along the path of electron flow, conducting wall members separating adjacent resonant waveguide sections, said resonant waveguide sections being physically oriented with respect to the path of electron flow to substantially align the in-phase mode of operation electric field lines within said resonant waveguide sections with the path of charged particle flow, said separating conducting wall members being aperture to provide capacitive coupling between adjacent waveguide sections and for the passage of the path of electron flow therethrough, means for producing negative mutual inductive coupling between adjacent resonant waveguide sections through apertures provided in said conducting wall members when said adjacent waveguide sections are operating in the in-phase mode of wave propagation, means for inserting high frequency wave energy to be amplified onto said waveguide structure, said waveguide structure being proportioned with respect to the velocity of the electron flow to produce energy transfer from the electrons passable through the waveguide structure to the applied wave energy propagating on said waveguide structure in the same direction as the direction of electron flow and at the fundamental space harmonic of the propagating wave, and means for extracting amplified wave energy from said waveguide structure applied thereto via said wave energy inserting means.

38. The apparatus according to claim 37 wherein said resonant waveguide sections comprise a plurality of substantially circular waveguide sections successively arranged end to end, said circular waveguide sections having conducting fingers inwardly protruding from the side walls at substantially 90° intervals about the periphery of said waveguide sections adjacent sections being rotationally displaced with respect to each other by an angle of substantially 45°, said conducting wall members separating adjacent waveguide sections having a plurality of inductive slots cut therethrough extending radially outward from the capacitive coupling apertures centrally disposed of said conducting wall members.

(References on following page)

References Cited by the Examiner

UNITED STATES PATENTS

| | | | |
|---|---|---|---|
| 2,423,327 | 7/1947 | Lafferty | 315—5.39 X |
| 2,432,093 | 12/1947 | Fox | 333—73 |
| 2,541,375 | 2/1951 | Mumford | 333—73 |
| 2,637,001 | 4/1953 | Pierce | 315—3.6 |
| 2,691,766 | 10/1954 | Clapp | 333—21 |
| 2,720,630 | 10/1955 | Kannenberg | 333—21 X |
| 2,729,794 | 1/1956 | Cohn | 333—21 |
| 2,841,738 | 7/1958 | Pierce | 315—3.5 |

OTHER REFERENCES

Ragan: Microwave Transmission Circuits, vol. 9, M.I.T. Radiation Lab. Series, McGraw-Hill, May 21, 1948, pp. 661–667.

GEORGE N. WESTBY, *Primary Examiner.*

RALPH G NILSON, *Examiner.*